United States Patent [19]

Wimmer et al.

[11] Patent Number: 4,662,622
[45] Date of Patent: May 5, 1987

[54] AIR DENSITY ADAPTIVE VACUUM CONTROLLER

[75] Inventors: Guenther W. Wimmer; David B. Kreitlow, both of Portland, Oreg.

[73] Assignee: Tektronix, Inc., Beaverton, Oreg.

[21] Appl. No.: 631,968

[22] Filed: Jul. 18, 1984

[51] Int. Cl.⁴ .............................................. B65H 3/12
[52] U.S. Cl. ........................................ 271/96; 271/98; 271/105; 271/108; 271/196; 271/276
[58] Field of Search ........................ 271/90, 94, 95, 96, 271/97, 105, 108, 30.1, 276, 196, 194, 195, 197, 98; 355/14 SH

[56] References Cited

U.S. PATENT DOCUMENTS

| | | | |
|---|---|---|---|
| 3,595,563 | 7/1971 | Rostoker | 271/105 X |
| 3,916,790 | 11/1975 | Alix | 271/108 X |
| 4,127,265 | 11/1978 | Wirz et al. | 271/260 |
| 4,184,672 | 1/1980 | Watkins et al. | 271/108 X |
| 4,184,674 | 1/1980 | Wirz et al. | 271/260 |
| 4,369,964 | 1/1983 | Jinnai et al. | 271/276 X |
| 4,385,229 | 5/1983 | Middleditch | 271/95 X |
| 4,397,459 | 8/1983 | Silverberg et al. | 271/94 |
| 4,437,659 | 3/1984 | Caron et al. | 271/276 |
| 4,513,957 | 4/1985 | Schaefer, Jr. | 271/90 |

*Primary Examiner*—Richard A. Schacher
*Attorney, Agent, or Firm*—Allston L. Jones; Robert S. Hulse

[57] ABSTRACT

A vacuum media capturing and retention system for a drum type printer or recorder is disclosed. The apparatus includes a vacuum drum with two regions of vacuum passages, one for capturing the leading edge of the media and the second for retaining the trailing edge of the media. When the leading edge of the media is initially captured the vacuum level in the drum is at one level. After the leading edge of the media is captured the vacuum level is dropped to a lower level until the trailing edge of the media is captured. Following the capture of the media trailing edge, the vacuum level within the drum is again increased to retain the media thereto during the copying or recording operation of the overall device.

14 Claims, 3 Drawing Figures

200~# AIR DENSITY ADAPTIVE VACUUM CONTROLLER

TECHNICAL FIELD

This invention relates to media management systems for printers, copiers, and the like, and particularly relates to such systems which utilize vacuum loading systems which are adaptive to variations in air density

BACKGROUND OF THE INVENTION

An important system used in many copiers and printers is an imaging drum for holding and moving print media in a known relationship relative to the imaging or printing elements. One of the key problems associated with such drums involves mounting the print media in a fixed position on the drum, and monitoring the accuracy of the mounting process in order to detect paper jams and improper mounting positions.

In the prior art these problems have been dealt with in several different ways. For example, expensive and complicated mechanical feed systems have been developed to load the media onto the drum and to hold the media in juxtaposition with the drum. See for example, U.S. Pat. No. 4,025,175, issued May 24, 1977 entitled "Electrophotographic Copying Apparatus Having a Dual Cam Synchronizing Mechanism" by Yokozawa et. al., assigned to Iwatsu Electric Co., Ltd., and laid open Japanese Utility Model Applications, Nos. 75345/74 and 56826/78. Similarly, vacuum systems which in some instances are simpler and less expensive than these mechanical systems have been used to load the media onto the drum and to hold the media in place on the drum. Even in vacuum systems, however, an automated clamping system is sometimes used to hold down the leading edge of the media while the drum is rotated to bring the rest of the media into contact with the drum. Typical examples of some vacuum loading systems are illustrated by U.S. Pat. No. 4,345,752, issued Aug. 24, 1982, entitled "Sheet Transfer Apparatus," by Nakamura et. al., assigned to Tokyo Shibaura Denki Kabushiki Kaisha; U.S. Pat. No. 3,865,364 issued Feb. 11, 1975 entitled "Anti-Curl Sheet Feeding Apparatus" by Robert A. Sterner, assigned to FMC Corporation; and U.S. Pat. No. 4,310,151 issued Jan. 12, 1982, entitled "Sheet Feeding Apparatus" by Sakae Fujimoto, assigned to Ricoh Company, Ltd.

In all of these systems, it is often difficult and expensive to monitor the mounting process to detect media jams and improper mounting. Hence, it is not unusual for manufacturers to rely almost entirely on the operator to notice that the media is not being fed or that copies are skewed, rather than to use machine diagnostics and monitoring systems. In automated systems, however, an operator may not be available to provide for such diagnostics. Hence some systems have been developed which directly monitor the mounting process. For example, a typical approach is to use a system of photo-detectors to determine the locations of the edges of the media relative to particular points in the system at different times. The general result is that even for relatively few monitoring points, the system can be quite sophisticated and expensive, and the monitoring apparatus itself can be prone to failure. In addition, for vacuum operated systems, such monitoring is especially important due to the fact that changes in air density, for example due to changes in geographical elevation, temperature and humidity, can have dramatic effects on the vacuum characteristics and hence serious deleterious consequences on the media handling ability of the system.

What is needed is a simple, inexpensive media handling system, such as a vacuum system, which has a built-in monitoring function and which is adaptive to changes in air density.

SUMMARY OF THE INVENTION

In accordance with preferred embodiments of the invention, an air density adaptive vacuum control system is provided for use in media handling apparatus for copiers and printers. The apparatus includes a vacuum drum having two regions of vacuum retention passages, one region for capturing the leading edge of the media and a second region for capturing the trailing edge of the media. Also included is a blower under microprocessor control for creating a vacuum in the vacuum drum and a vacuum switch for providing a first signal to the microprocessor when the vacuum level in the vacuum drum is below a trip point $V_0$, and for providing a second signal when the vacuum level in the vacuum drum is at or above $V_0$.

During the first phase of operation, the blower speed is slewed upward until the vacuum switch is activated, indicating that the vacuum level in the drum is at or above $V_0$. The speed of the blower when the vacuum switch is tripped is then recorded for later use, that speed hereinafter being called $w_0$.

During the second phase, the speed of the blower is decreased to a speed $w_1 = f_1 w_0$, where $f_1$ is a preselected value less than 1. Speed $w_1$ corresponds to a vacuum level $v_1$ which is lower than vacuum level $V_0$, and causes deactivation of the vacuum switch. After the vacuum switch is deactivated, a first edge of the recording media is moved into proximity of the first region of vacuum retention passages and is captured by them, thus blocking the passages. This causes the vacuum level to increase in the drum to a level above $V_0$ and hence again trips the vacuum switch. In response, the microprocessor then decreases the speed of the blower to a speed $w_2 = f_2 w_0$ where $f_2$ is a preselected value less than 1, the speed $w_2$ corresponding to a vacuum level $V_2$ below $v_0$, but high enough to provide the suction required to hold the first edge of the recording media in contact with the drum as it is rotated to load the media onto the drum.

At the end of the rotation of the drum, the second edge of the recording media covers the second region of vacuum retention passages and is captured by them, causing the vacuum in the drum to again rise above the level $V_0$ and tripping the vacuum switch. This normalization of the operation of the system in terms of the trip point $V_0$ and its corresponding blower speed $w_0$, eliminates the dependence of the system on air density. Also, by monitoring the activation and deactivation of the vacuum switch, various fault modes can be detected. For example, failure of the vacuum switch to trip when attempting to capture either the first or second edge of the recording media corresponds to a media load failure. Similarly, release of the switch after loading of the media corresponds to the media coming loose of the imaging drum.

DETAILED DESCRIPTION OF THE INVENTION

Figure 1:
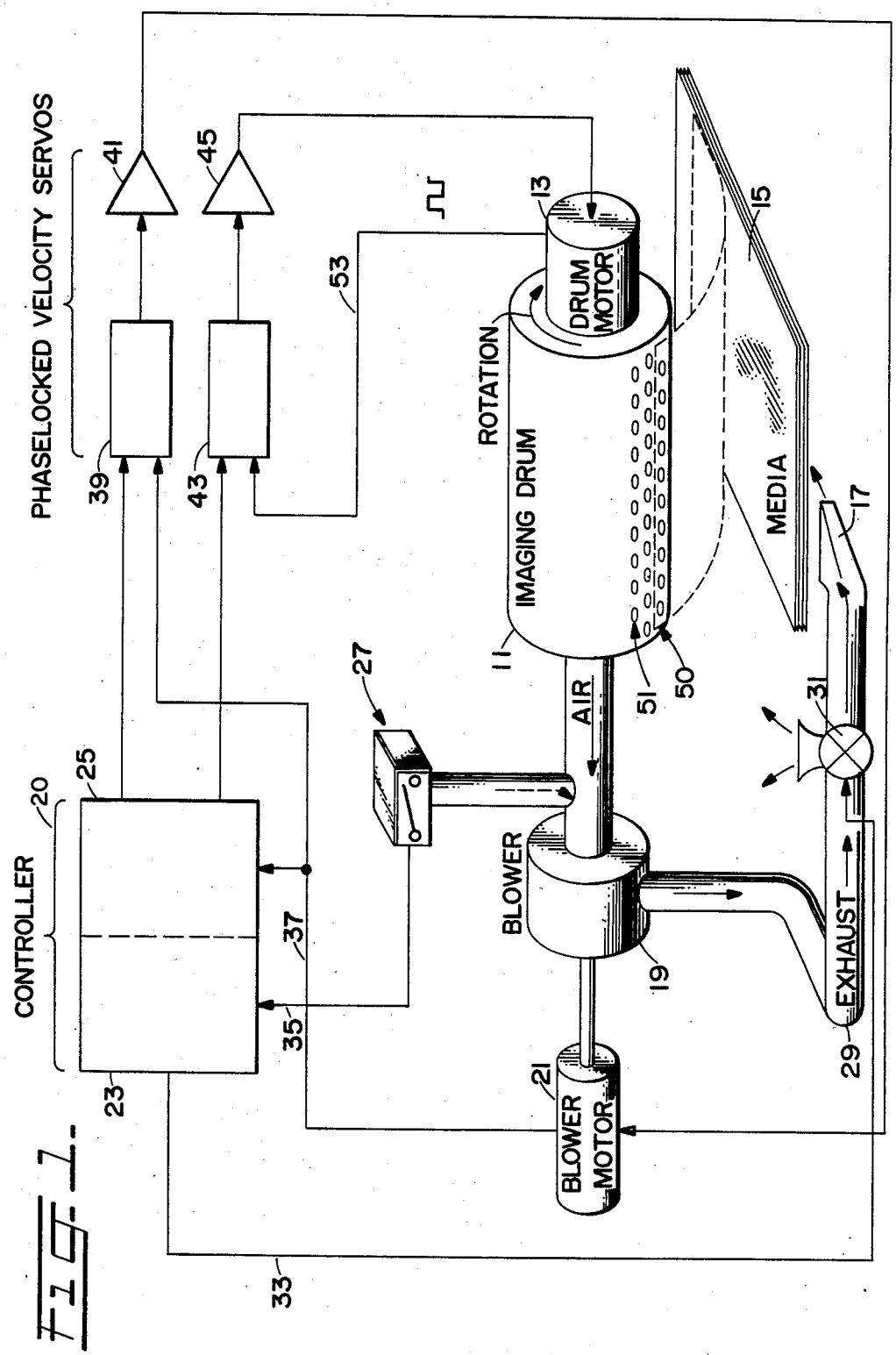
FIG. 1 shows an air density adaptive vacuum control system according to the invention for the management of recording media.

FIG. 1 is a block diagram of a media management system according to the invention for use in devices such as printers and copiers. The system includes a vacuum imaging drum 11 onto which media, such as paper sheet 15, is loaded via first and second regions of a media retention vacuum passages 50 and 51. In this embodiment the vacuum for drum 11 is provided by a blower 19 driven by a blower motor 21 which is controlled by a phase-locked electronics system 39 and driver amplifier 41. Similarly, the rotation of drum 11 which is necessary for loading the media is provided by a motor 13 which is also controlled by a phase-locked electronics system 43 and driver amplifier 45. vacuum levels in the drum are monitored by a vacuum switch 27, preferably a bi-level diaphram switch having a single trip point, corresponding to a vacuum level $V_0$.

In order to encourage the attachment of the media to the drum, the exhaust from the blower is diverted to the region of the media supply tray (not shown) by an electronically controlled valve 31, hereinafter called a fluff valve. The effect of the airstream from the blower exhaust port 17 is to cause the uppermost media sheets to be displaced upward, i.e. "fluffed", in the proximity of the drum's first region of media retention passages 50, so that the vacuum in the drum can be effective in capturing one edge of the top sheet in the tray. The drum is then rotated until the trailing edge of the sheet is captured by the second region of media retention passages 51.

Control for the media management system is provided by a controller 20 having a microprocessor 23 and a timer/rate generator 25. Microprocessor 23 provides the signals required to activate the fluff valve based on input signals from the timer/rate generator 25 and from vacuum switch 27. The timer/rate generator 25 provides the reference signals for the phase-locked electronics system 39 and 43 and receives feedback signals on line 37 from the blower motor in order to monitor the blower velocity. Note that feedback signals on signal line 37 are also input to phase-locked electronic system 39. Similarly, a feedback signal corresponding to the velocity of the drum is provided to phase-locked electronic system 43 via signal line 53. (Note: During loading of the media the drum is indexed through direct microprocessor control as opposed to a phase-locked servo loop.)

Figure 2:
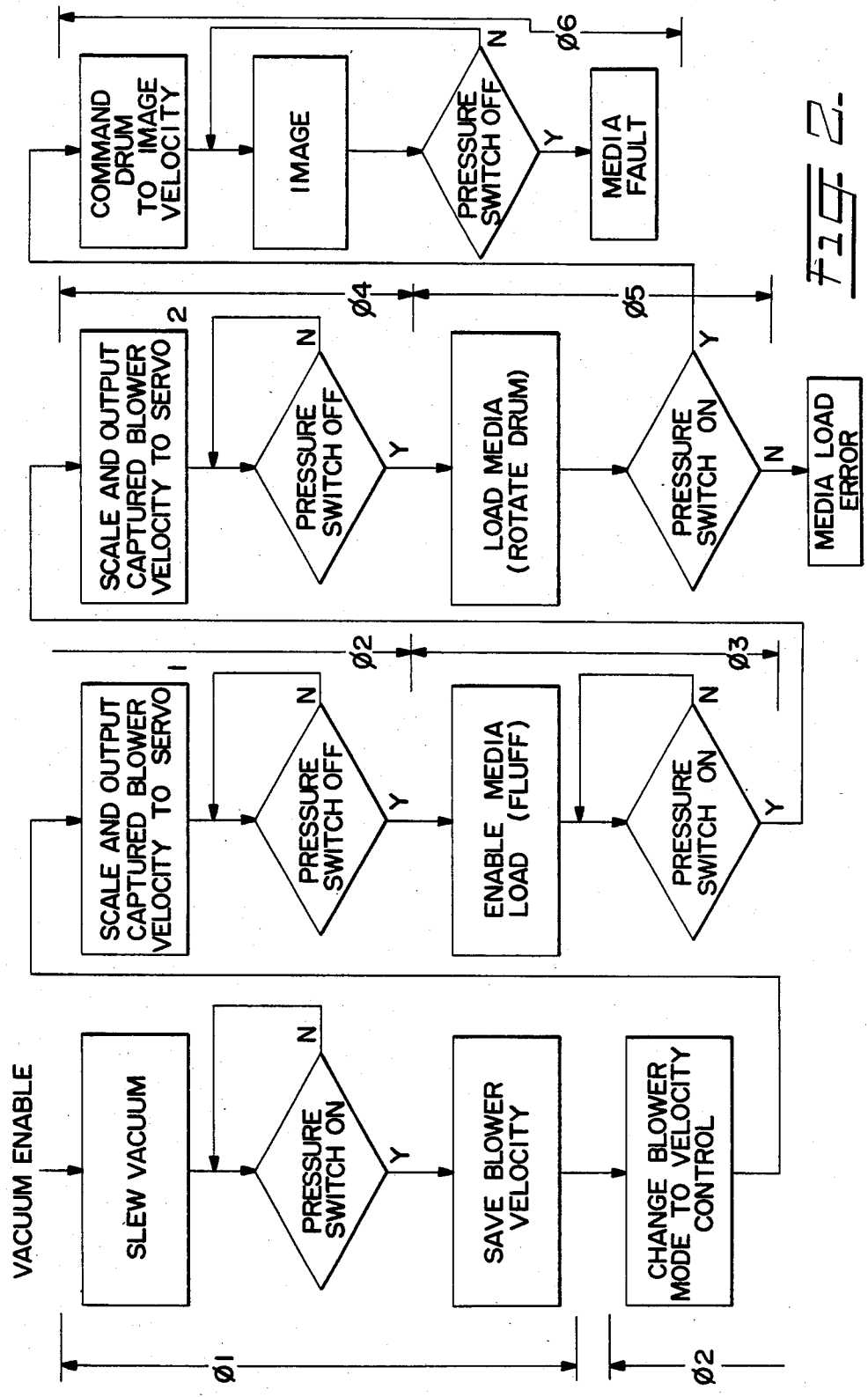
FIG. 2 is a flow chart of a method according to the invention.
Figure 3:
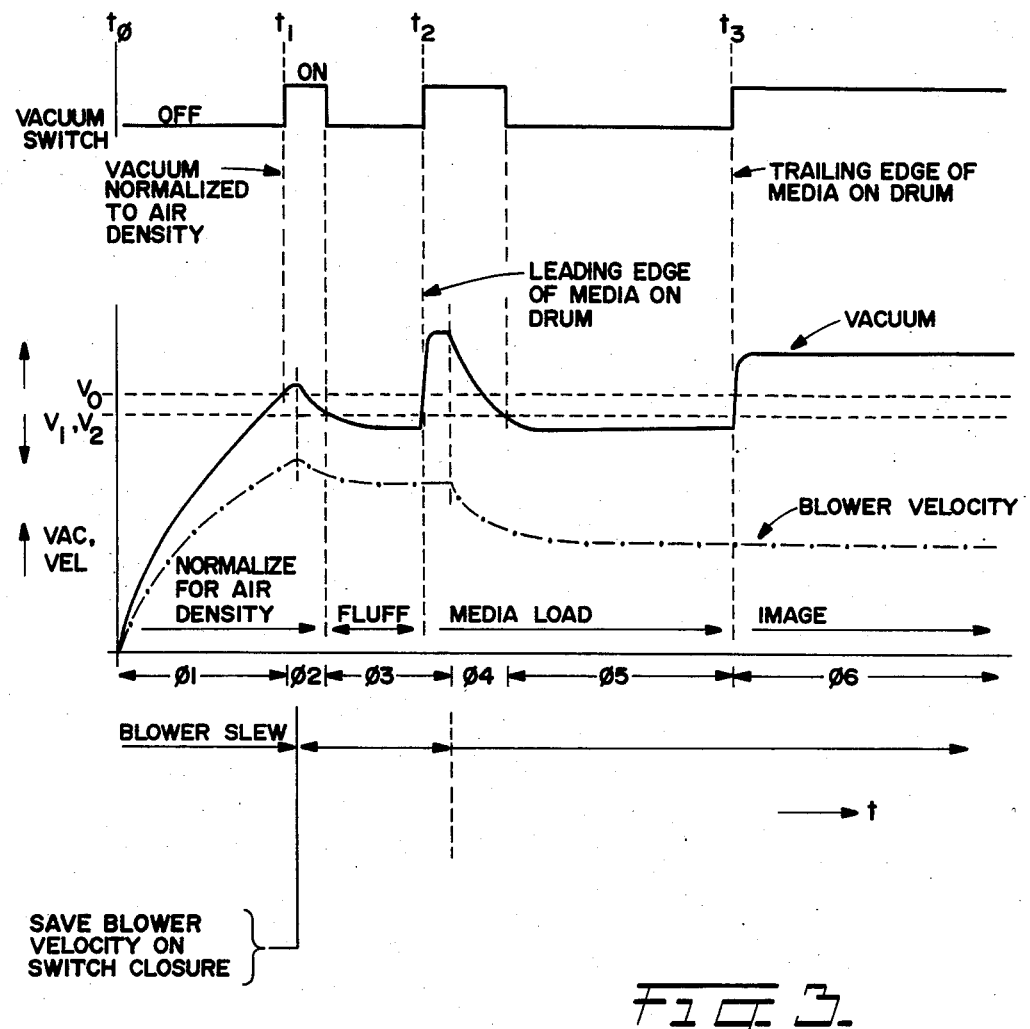
FIG. 3 is a graph showing the operation of the vacuum switch, the vacuum level in the vacuum drum and the speed of the blower as a function of the phase of operation of the invention.

A preferred embodiment of a method according to the invention is illustrated by the flow chart shown in FIG. 2 and the timing diagram shown in FIG. 3. During the first phase of operation, $\phi_1$, the blower velocity is slewed upward until vacuum switch 27 is activated, (at vacuum level $V_0$), at which time the corresponding blower velocity $w_0$ is recorded.

By using this preselected trip point, the rest of the operations of the media management system can be scaled relative to the parameters characteristic of the trip point according to the basic fan law, $P = Kpw^2$, where P is the static pressure created by the blower, p is the density of air, w is the blower angular velocity, and K is a constant of proportionality which is independent of air density.

To achieve this scaling, the value of "Kp" can be evaluated by substituting the known value of the static pressure (corresponding to the trip point $v_0$) and the measured value of the blower angular velocity $w_0$ into this basic fan law equation. Subsequent fan speeds can then be set by the microprocessor as some fraction of the initial angular velocity $w_0$ to achieve the desired vacuum level. Assuming that the air density remains reasonably constant during the operations on any one particular sheet of media, this measured calibration permits operation of the system which is adapted to variations of air density due to geographical elevation, temperature, and humidity, and acts essentially as a normalization factor for the existing air density at the time of operation. This purely analytical approach to scaling is not used in this preferred embodiment, however. Instead an approach is used which will become apparent from the discussions below with respect to the subsequent phases of operation.

During the second phase of operation, $\phi_2$, after recording the blower velocity $w_0$, the blower is operated in the "velocity" mode and controller 20 scales down the blower velocity to a value $w_1$, corresponding to a vacuum level $v_1$ just below the trip point $v_0$, thereby deactivating vacuum switch 27. Analytically, the new velocity $w_1$, can be expressed as $w_1 = f_1 w_0$, where $f_1$ is a preselected constant having a value less than 1. This constant is chosen experimentally to correspond to the vacuum level $v_1$ in the drum which is far enough below $V_0$ that typical ambients in static pressure do not inadvertently trip the vacuum switch 27 back on, yet close enough to $v_0$ for the apparatus to operate appropriately during the next phase. Note that analytically $v_1 = f_1^2 V_0$, so that $v_1$ is determined by the trip point and $f_1$, regardless of air density.

During the next phase, $\phi_3$, while maintaining the blower velocity approximately constant at $w_1$, the fluff valve 31 is activated to "fluff" the media adjacent to the vacuum drum so that the leading edge of the media is captured by the vacuum from the first region of vacuum retention passages 50. For this to occur vacuum level $V_1$ must be chosen high enough (i.e., at a low enough static pressure) and the vacuum retention passages must be of appropriate size so that the pressure difference across the vacuum retention passages is high enough to overcome the weight of the media and the forces induced by the rotation of the drum which occur during media loading. Also vacuum level $V_1$ is chosen close enough in value to vacuum level $V_0$ that when the leading edge of the media is captured, the incremental increase in vacuum inside the drum is sufficient to trip the vacuum switch 27, thus providing a positive indication of capture to the microprocessor.

During phase $\phi_4$, which follows media capture, the blower velocity is decreased to a preselected value $w_2 = f_2 w_0$, where $f_2$ is less than 1 and will generally be less than $f_1$, causing the vacuum level in the drum to drop to a level $v_2$ which again is chosen to be just below the trip point $V_0$.

During phase $\phi_5$ the vacuum drum is rotated approximately 360°, wrapping the media onto the drum until the trailing edge of the media is captured by the vacuum from the second region of vacuum retention passages 51. Again, the vacuum level $v_2$ and the size of the vacuum retention passages 51 are chosen such that capture of the trailing edge of the media causes the vacuum within the drum to increase to a point above the trip point $V_0$, thereby providing a positive indication of the capture to the microprocessor.

The following phase, $\phi_6$, corresponds to the control interval during which the imaging process occurs.

For the preferred embodiment illustrated in FIG. 1, which uses a standard paper size of $8\frac{1}{2}'' \times 11''$, the vacuum switch 27 is set to trip at a nominal operating vacuum $V_0$ of approximately 7 inches of water. The dead zones corresponding to the difference between $V_0$ and $V_1$ and between $V_0$ and $V_2$ are chosen to be approximately 3-5% of $V_0$ in order to avoid spurious tripping of the vacuum switch during operation. Also, in the preferred embodiment, the first region of media retention vacuum passages 50 is chosen to be a row of 7 holes, each having a diameter of about 0.150 inches. Similarly, the second region of media retention passages is chosen to be 7 holes of about this same diameter or slightly smaller. The determination of $f_1$ and $f_2$ is made empirically rather than analytically for each system, based on the chosen values for the dead zones and the trip point $V_0$, since as a general rule $V_1$ and $V_2$ are relatively complicated functions of the area of the media retention vacuum passages and the leakage of the air plenums.

The diagnostic features for the media management system are a natural result of the above method and are closely tied to the activation and deactivation of vacuum switch 27. For example, failure of switch 27 to deactivate during predetermined times during control phase $\phi_3$ or $\phi_5$ corresponds to a media load failure. Similarly, deactivation of the switch during control phase $\phi_6$ is interpreted as the media coming loose of the imaging drum. By programming the controller to recognize these failure patterns, the system becomes self-diagnostic and can provide appropriate error messages to the user.

It will be apparent to those skilled in the art that the invention disclosed herein may be embodied in other specific forms without departing from the spirit and essential characteristics thereof. For example, the particular operating pressure for the activation of switch 27 may be considerably different depending on the type and size of media to be used in the apparatus. The vacuum switch need not be of diaphram type. The first and second regions of media retention vacuum passages need not be two rows of holes, but could instead be two slits, for example. Also, the invention may be only partially implemented. For example, a mechanical clamp could be used on the leading edge of the media and a vacuum system could be used on the trailing edge, or vice versa. Also, a vacuum system could be used for the pickup and for holding the front edge, and a clamp could be used on the trailing edge. Accordingly, the disclosure of the present invention is intended to be illustrative, but not limiting, of the scope of the invention which is set out in the following claims.

What is claimed is:

1. A method of mounting media onto a vacuum drum having a first region of vacuum retention passages, said vacuum drum being coupled to a blower for creating a vacuum in said vacuum drum, comprising the steps of:
   a. increasing the speed of said blower until the vacuum in said vacuum drum is at an air density adaptive level $V_0$ at which a vacuum switch is activated;
   b. recording the speed of said blower after said vacuum switch is activated in step a., said speed then being that speed which is sufficient to establish said vacuum level $V_0$ and being hereinafter designated as $w_0$;
   c. decreasing the speed of said blower to a value $w_1 = f_1 w_0$ and deactivating said vacuum switch thereby, wherein $f_1$ has a preselected value less than 1, and the speed $w_1$ corresponds to a vacuum level $V_1$ which is lower than vacuum level $V_0$ but high enough to capture a first edge of said media at asid first region; and
   d. after step c., moving said first edge of said media into proximity of said first region on said vacuum drum to cause said media to be held in contact with said vacuum drum near said first edge with said media covering said first region so that said vacuum in said drum increases to a level at or above level $V_0$ to activate said vacuum switch.

2. A method as in claim 1 wherein said vacuum drum has a second region of vacuum retention passages, further comprising the steps of:
   e. after step d., reducing the speed of said blower to a speed $w_2 = f_2 w_0$ where $f_2$ is a preselected value less than 1, said speed $w_2$ corresponding to a vacuum level $V_2$ below which siad vacuum switch is not activated, and said vacuum level $V_2$ sufficiently high to hold said media to said drum while said media is loaded onto said drum; and
   f. after step e., moving said vacuum drum relative to said media to load said media onto said drum and to cover said region of said vacuum drum with said media to cause said vacuum in said vacuum drum to increase to a level at or above level $V_0$ threby activating said vacuum switch.

3. A method as in claim 2 further comprising the steps of:
   g. monitoring activation and deactivation of said vacuum switch to detect proper and improper loading of said media onto said drum.

4. A method as in claim 1 wherein step d. comprises blowing air over said first edge of said media.

5. a device for mounting and managing media comprising:
   a vacuum drum having a first region of vacuum retention passages;
   a blower means for creating a vacuum in said vacuum drum;
   a vacuum switch coupled to said vacuum drum which provides a first signal when said vacuum is below a trip point V0 and a second signal when said vacuum is at or above said trip point V0;
   means for positioning said media in the proximity of said first region of vacuum retention passages to enable said vacuum to capture a first edge of said media and thereby obscure said first region of vacuum retention passages;
   timer means responsive to said first and second signals from the vacuum switch for identifying the phases of operation of the device from among a plurality of phases; and
   control means responsive to the timer means and to said first and second signals from said vacuum switch for controlling the activation and deactivation of said positioning means and for controlling the velocity of said blower means as necessary for each of the phases of operation of the device.

6. A device as in claim 5 wherein said control means sets said blower velocity at a value w1 which corresponds to a vacuum level less than V0 before said positioning means is activated, and which corresponds to a vacuum level greater than or equal to V0 after said positioning means is activated and said first region of media retention passages is obscured.

7. A device as in claim 6 further comprising motor means for rotating said vacuum drum in response to a control signal from said control means.

8. A device as in claim 7 wherein said control means is for providing said control signal to activate said motor means after said first edge of media is captured by said first region of said vacuum retention passages.

9. A device as in claim 8 wherein said vacuum drum comprises:
a second region of vacuum retention passages which are located in proximity of a second edge of said media after said drum is rotated.

10. A device as in claim 9 wherein said control means is for setting a blower velocity $w_2$ after said first edge of said media is captured which corresponds to a vacuum level below vacuum level $v_0$ after said first edge of media is captured and which corresponds to a vacuum level above vacuum level $v_0$ after said drum is rotated and said second region of vacuum retention passages has captured said second edge of said media.

11. A device for mounting and managing media comprising:
a vacuum drum defining a first region of vacuum retention passages;
a blower means coupled to the vacuum drum for creating a vacuum in said vacuum drum;
a vacuum switch coupled to said vacuum drive which provides a first signal when said vacuum is below a trip point V0 and a second signal when said vacuum is at or above said trip point V0;
means coupled to the blower means for positioning said media in the proximity of said first region of vacuum retention passages; and
control and timer means including:
means for increasing the speed of said blower until the vacuum in said vacuum drum is at an air density adaptive level V0 at which a vacuum switch is activated during a first operational phase;
means sfor recording the speed of said blower after said vacuum switch is activated in the first phase, said speed then being that speed which is sufficient to establish said vacuum level V0 and being hereinafter designated as W0;
means for decreasing the speed of said blower to a value W1=f1 W0 and deactivating said vacuum switch thereby during a second operational phase following the first phase, where f1 has a preselected value less than 1, and the speed w1 corresponds to a vacuum level V1 which is lower than vacuum level V0 but high enough to capture a first edge of said media at said first region; and
means for activating said positioning means during a third operational phase following the second phase for moving said first edge of said media into proximity of said first region on said vacuum drum to cause said media to be held in contact with said vacuum drum near said first edge with said media covering said first region so that said vacuum in said drum increases to a level at or above level V0 to activate said vacuum switch.

12. A device as in claim 11 wherein:
said vacuum drum further defines a second region of vacuum retention passages; and
said control and timer means further includes:
means for reducing the speed of said blower, during a fourth operational phase after the third phase, to a speed W2=f2 W0 where f2 is a preselected value less than 1, said speed W2 corresponding to a vacuum level V2 below which said vacuum swithc is not activated, and said vacuum level V2 sufficiently high to hold said media to said drum while said media is loaded onto said drum; and
means for moving said vacuum drum relative to said media to load said media onto said drum, during a fifth operational phase following the fourth phase, and to cover said second region of said vacuum drum with said media to cause said vacuum in said vacuum drum to increase to a level at or above level V0 thereby activating aid vacuum switch during a sixth operational phase following the fifth phase.

13. A device as in claim 12 wherein said control and timer means further includes means for monitoring, during the sixth phase, activation and deactivation of said vacuum switch to detect proper and improper loading of said media onto said drum.

14. A device as in claim 11 wherein the positioning means includes duct and switch means for directing the exhaust from the blower means to the first edge of the media.

* * * * *